United States Patent
Grybos

(10) Patent No.: US 6,725,277 B2
(45) Date of Patent: Apr. 20, 2004

(54) CDMA CODE ADDRESS DATA ROUTING SYSTEM AND METHOD

(75) Inventor: David P. Grybos, San Jose, CA (US)

(73) Assignee: Space Systems/Loral, Inc, Palo Alto, CA (US)

(\*) Notice: Subject to any disclaimer, the term of this patent is extended or adjusted under 35 U.S.C. 154(b) by 225 days.

(21) Appl. No.: 10/094,898

(22) Filed: Mar. 11, 2002

(65) Prior Publication Data

US 2003/0179732 A1 Sep. 25, 2003

(51) Int. Cl.[7] ................................ G06F 13/00
(52) U.S. Cl. ...................................... 709/245
(58) Field of Search ................ 370/329, 320, 370/335; 709/231, 232, 238, 245

(56) References Cited

U.S. PATENT DOCUMENTS

| | | | | |
|---|---|---|---|---|
| 5,438,565 A | \* | 8/1995 | Hemmady et al. | 370/335 |
| 6,181,683 B1 | \* | 1/2001 | Chevillat et al. | 370/329 |
| 6,396,819 B1 | \* | 5/2002 | Fleeter et al. | 370/320 |

\* cited by examiner

*Primary Examiner*—Robert B. Harrell
(74) *Attorney, Agent, or Firm*—Kenneth W. Float

(57) ABSTRACT

Communications apparatus, such as a multibeam satellite communications system on-board a satellite, or terrestrial communications system, and methods that use a data routing technique that is based on the assignment of one or more codes corresponding to a destination beam. In particular, data routing is performed based on a CDMA code. The communications apparatus and methods allow simplified processing of the data address and routing of the data.

18 Claims, 3 Drawing Sheets

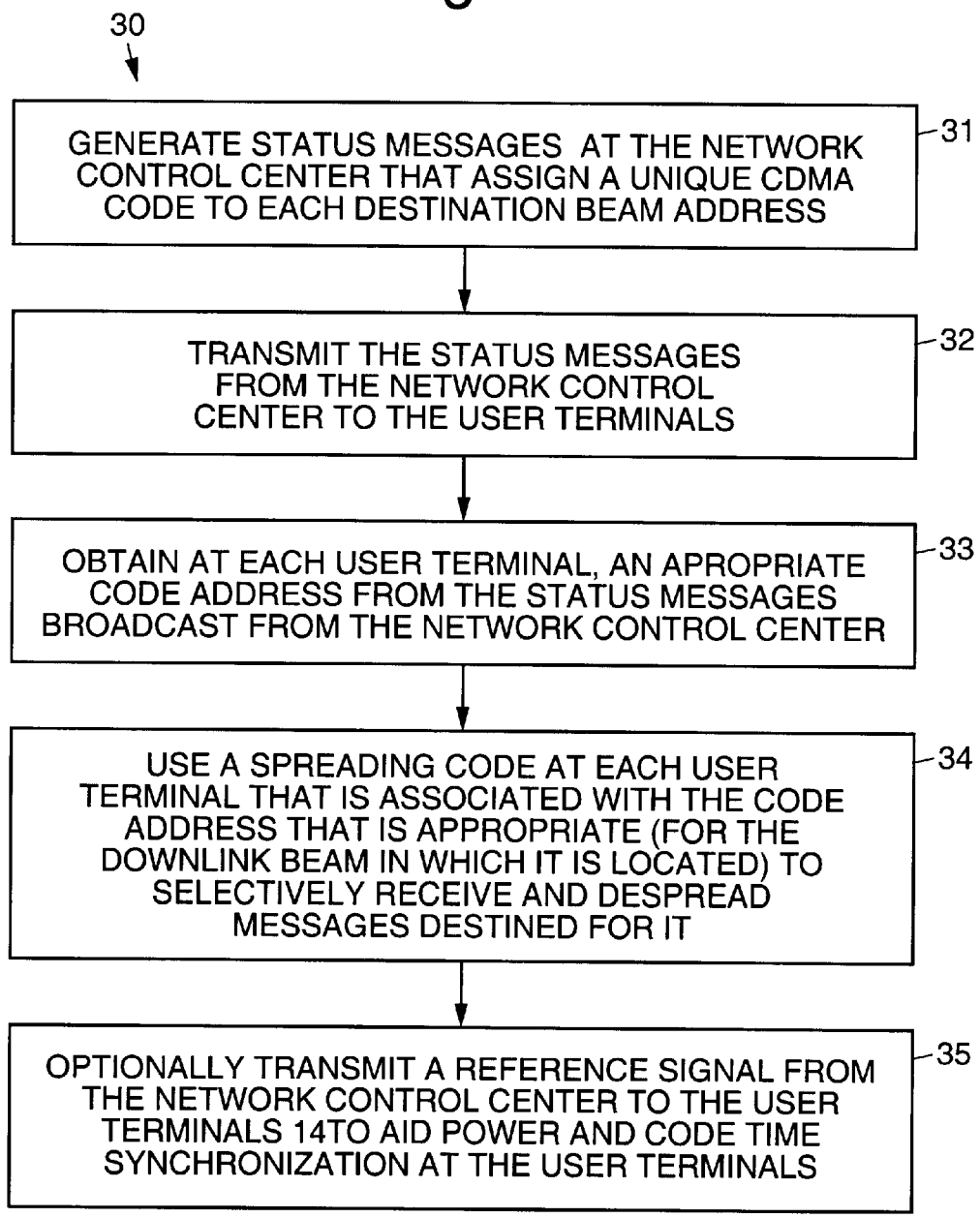

CDMA CODE ADDRESS DATA ROUTING SYSTEM AND METHOD

BACKGROUND

The present invention relates generally to satellite communication systems, and more particularly, to a communication system and processor embodying a code division multiple access (CDMA) code address data routing method.

The assignee of the present invention manufactures and deploys satellites that orbit the earth and which carry communication equipment. Conventional on-board processors process data communicated by way of the satellite communication equipment to demodulate, decode and individually interpret an address header. It would be desirable for the processor to not require address header processing. It would be desirable for routing to be performed based on a CDMA code. AT&T VoiceSpan has conceived a CDMA on-board processor, but it is not believed to utilize a CDMA spreading code as the router destination address.

It is an objective of the present invention to provide for a communication system and processor embodying a code division multiple access (CDMA) code address data routing method.

SUMMARY OF THE INVENTION

To meet the above and other objectives, the present invention provides for a communications system and a method that does not implement address header demodulation, decoding or interpretation to communicate. Instead, a data routing process is performed based on the assignment of one or more codes corresponding to a destination beam. In particular, data routing is performed based on a CDMA code. The communications system and method allow simplified processing of the data address and routing of the data received by the communications system on-board the satellite.

The present invention may be advantageously employed in a satellite-based communication or data routing system. In addition, the present invention may be used in terrestrial fiber router applications, for example.

An exemplary communication system comprises a satellite having a multibeam communication system disposed thereon. A plurality of ground-based user terminals 14 communicate with each other by way of the multibeam communication system. A network control center controls the multibeam communication system and communicates by way of the communication system with the user terminals, and wherein the network control center transmits status messages to the multibeam communication system and user terminals that assign a unique CDMA code to each destination beam address. Each transmitting user terminal utilizes a spreading code appropriate for the destination downlink beam in which the recipient terminal is located to spread and transmit messages destined for the recipient terminal. The communication system on-board the satellite removes the unique CDMA code used as the destination beam address as part of the on-board routing function. The despread downlink signal can be formatted so that it is readable by all terminals in the downlink beam or uniquely addressed to individual terminals within the beam. Addressing of messages to individual terminals within the destination beams may be done with additional CDMA codes to uniquely identify the intended recipient terminal or it may be done with TDM headers or FDM frequency assignments as appropriate for the signals to which the destination beam CDMA code is applied.

An exemplary data routing method comprises the following steps. Status messages are generated at the network control center that assign a unique CDMA code to each destination beam address. The network control center transmits the status messages to the user terminals. Each user terminal obtains an appropriate code address from the status messages, preferably during user registration and authentication. Each transmitting user terminal uses a spreading code associated with the code address that is appropriate for the downlink beam in which the recipient terminal is located to selectively spread and transmit messages destined for it. A recipient terminal further demodulates and decodes the downlink signal to identify messages addressed to it. A reference signal may be transmitted from the network control center to aid power and code time synchronization at the user terminals.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3 illustrates an exemplary method in accordance with the principles of the present invention.

DETAILED DESCRIPTION

Figure 1:
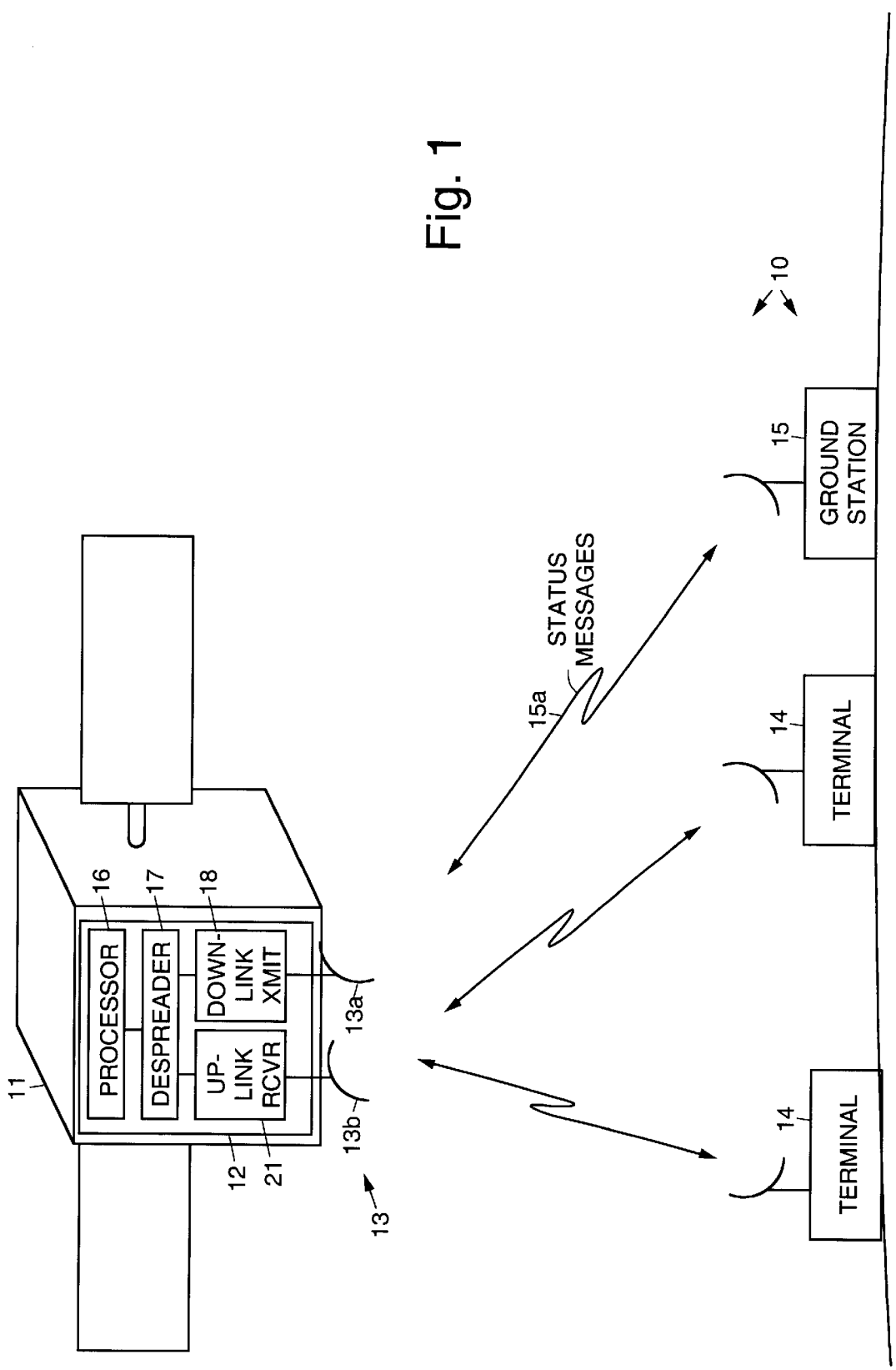
FIG. 1 illustrates an exemplary satellite based communication system in accordance with the principles of the present invention.

Referring to the drawing figures, FIG. 1 illustrates an exemplary (and preferred) satellite based communication system 10 in accordance with the principles of the present invention. However, it is to be understood that the present invention may be used in terrestrial fiber communication systems 10, for example.

The communication system 10 comprises a satellite 11 that carries a communication system 12 employing a plurality of communication antennas 13. A plurality of ground-based user terminals 14 communicate with each other by way of the communication system 12.

A network control center 15 controls the communication system 12 on the satellite 11 and also communicates by way of the communication system 12 with the user terminals 14. The network control center 15 preferably transmits status messages 15a to the user terminals 14 by way of the communication system 12 on the satellite 11.

One of the communication antennas 13 of the communication system 12 onboard the satellite 11 comprises a multibeam transmit (downlink) antenna 13a. The multibeam transmit antenna 13a produces a plurality of downlink beams that cover a predetermined area of the ground that include locations of the plurality of user terminals 14. Another communication antenna 13b on-board the satellite 1 comprises a multibeam receive (uplink) antenna 13b.

The communication system 12 includes an uplink receiver (RCVR) 21 that includes the multibeam receive (uplink) antenna 13b. The uplink receiver 21 is coupled to a CDMA router 17 comprising a despreader 17. The CDMA router 17 or despreader 17 is coupled to a downlink transmitter (XMIT) 18 that includes the multibeam transmit antenna 13a. A processor 16 is coupled to the CDMA router 17 or despreader 17 and supplies unique CDMA codes thereto.

Figure 2:
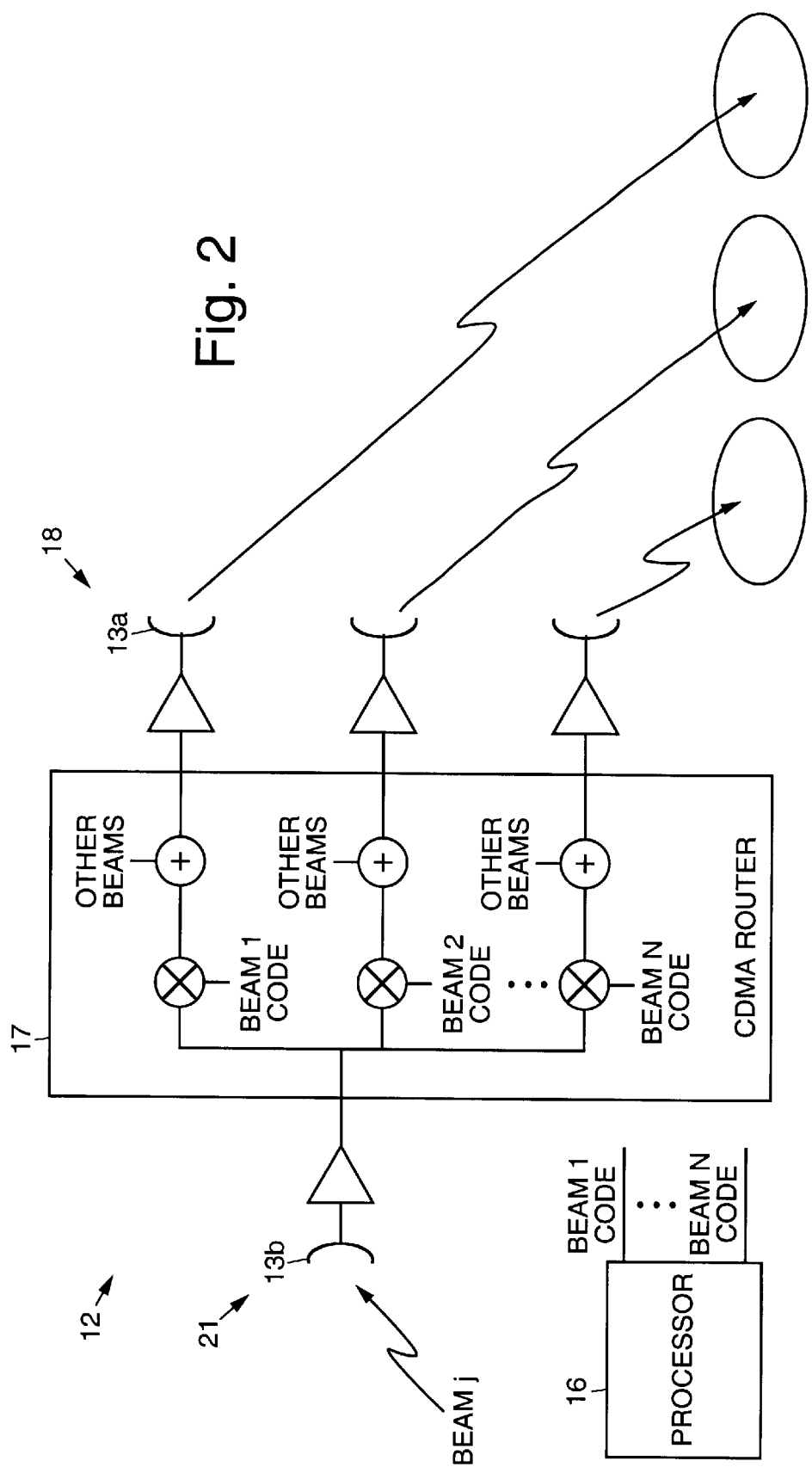
FIG. 2 illustrates details of the satellite based communication system shown in FIG. 1.

Referring to FIG. 2, it illustrates details of the satellite based communication system shown in FIG. 1. The processor 16 is coupled to the despreader 17. The despreader 17 is coupled between the uplink receiver 21 and the downlink beam transmitter 18. The downlink beam transmitter 18 is coupled to the multibeam transmit antenna 13a.

In the satellite based communication system 10 implemented in accordance with the present invention, the processor 16 assigns a unique CDMA code to each destination beam address. The output of the despreader 17 is connected to the destination downlink beam transmitter 18. A user terminal 14 utilizes a spreading code appropriate for the destination downlink beam. Uplink signals destined for other downlink beams are not despread and merely contribute to re-transmitted noise by a small amount determined by the characteristics of the spreading code set that is utilized. Signals from all other uplink beams are summed after despreading into the downlink channel to accomplish the beam to beam routing enabled by the destination beam CDMA code. The communication system 10 on-board the satellite 11 may also transmit a reference signal to aid user terminal power and code time synchronization.

User terminals 14 preferably obtain the code addresses from the status messages 15a broadcast by the communication system 10 on the satellite 11 that are sent from the network control center 15 during user registration and authentication. However, it is to be understood that the code addresses may be obtained using means other than the transmitted status messages 15a.

This technique of broadcasting status messages 15a to user terminals 14 to transmit the code addresses eliminates need for additional data packet address and routing table processing on-board the satellite 11. This technique also reduces the complexity of multi-beam multicasting communication systems 10 where an uplink terminal 14 distributes data to multiple separate destinations and point-to-point connectivity communication systems 10 in which service is provided for a terminal 14 to transmit data to another individual terminal 14.

FIG. 3 illustrates an exemplary method 30 in accordance with the principles of the present invention. The exemplary method 30 is employed with a satellite-based multibeam communication system 10 that provides a communication link between a plurality of ground-based user terminals 14. A network control center 15 communicates by way of the multibeam communication system 12 on the satellite 11 with the user terminals 14. The exemplary method 30 comprises the following steps.

Status messages 15a are generated 31 at the network control center 15 that assign a unique CDMA code to each destination beam address. The network control center 15 transmits 32 the status messages 15a to the user terminals 14 by way of the communication system 12 on the satellite 11. Each user terminal 14 obtains 33 an appropriate code address from the status messages 15a broadcast from the network control center 15, preferably during user registration and authentication. Each user terminal 14 uses 34 a spreading code associated with the code address that is appropriate for the downlink beam in which it is located to selectively receive and despread messages destined for it. A reference signal may be transmitted 35 from the network control center 15 to aid power and code time synchronization at the user terminals 14.

Thus, a communication system and processor embodying a code division multiple access (CDMA) code address data routing method have been disclosed. It is to be understood that the described embodiments are merely illustrative of some of the many specific embodiments which represent applications of the principles of the present invention. For example, although a preferred embodiment of the present invention is designed for use with a satellite communication system, the present invention is applicable for use with terrestrial fiber routers, for example. Clearly, numerous and other arrangements can be readily devised by those skilled in the art without departing from the scope of the invention.

What is claimed is:

1. Communication apparatus comprising:
   a communication system;
   a plurality of user terminals communicate with each other by way of the communication system; and
   a network control center controls the communication system and communicates by way of the communication system with the user terminals, and wherein the network control center transmits status messages to the communication system and user terminals that assign a unique CDMA code to each destination address;
   and wherein each user terminal utilizes a spreading code appropriate for where it is located to receive and despread messages destined for it.

2. The apparatus recited in claim 1 further comprising:
   a satellite;
   a multibeam communication system disposed on the satellite; and
   wherein the plurality of ground-based user terminals communicate with each other by way of the multibeam communication system;
   and wherein the network control center controls the multibeam communication system on the satellite and communicates by way of the communication system with the user terminals, and transmits status messages to the multibeam communication system and user terminals that assign a unique CDMA code to each destination beam address;
   and wherein each user terminal utilizes a spreading code appropriate for the destination downlink beam in which it is located to receive and despread messages destined for it.

3. The apparatus recited in claim 2 wherein the multibeam communication system comprises a processor, a despreader that is coupled to the processor, a downlink beam transmitter that is coupled to the despreader, and a multibeam transmit antenna that is coupled to the downlink beam transmitter.

4. The apparatus recited in claim 3 wherein the multibeam transmit antenna produces a plurality of beams that cover a predetermined area of the ground that include locations of the plurality of user terminals.

5. The apparatus recited in claim 2 wherein the network control center transmits the status messages to the user terminals by way of the communication system on the satellite.

6. The apparatus recited in claim 2 wherein the network control center transmits a reference signal to the user terminals to aid user terminal power and code time synchronization at the user terminals.

7. The apparatus recited in claim 2 wherein the status messages are broadcast from the network control center during user registration and authentication.

8. The apparatus recited in claim 1 wherein the network control center transmits a reference signal to the user terminals to aid user terminal power and code time synchronization at the user terminals.

9. The apparatus recited in claim 1 wherein the status messages are broadcast from the network control center during user registration and authentication.

10. The apparatus recited in claim 1 the communication system comprises a terrestrial communication system linking the network control center and the user terminals.

11. A data routing method that provides a communication link between a plurality of ground-based user terminals, and that comprises a network control center that communicates by way of the communication system with the user terminals, the method comprising the steps of:

generating status messages at the network control center that assign a unique CDMA code to each destination address;

transmitting status messages from the network control center to the user terminals;

obtaining, at each user terminal, an appropriate code address from the status messages broadcast from the network control center; and using a spreading code at each user terminal that is associated with the code address to selectively receive and despread messages destined for it.

12. The method recited in claim 11 further comprising the step of transmitting a reference signal from the network control center to the user terminals to aid power and code time synchronization at the user terminals.

13. The method recited in claim 11 wherein the status messages are transmitted from the network control center to the user terminals by way of a communication system 12 on a satellite.

14. The method recited in claim 11 wherein the status messages are broadcast from the network control center during user registration and authentication.

15. A data routing method for use with a satellite-based multibeam communication system that provides a communication link between a plurality of ground-based user terminals, and that comprises a network control center that communicates by way of the multibeam communication system with the user terminals, the method comprising the steps of:

generating status messages at the network control center that assign a unique CDMA code to each destination beam address;

transmitting status messages from the network control center to the user terminals;

obtaining, at each user terminal, an appropriate code address from the status messages broadcast from the network control center; and using a spreading code at each user terminal that is associated with the code address that is appropriate for the downlink beam in which it is located to selectively receive and despread messages destined for it.

16. The method recited in claim further comprising the step of transmitting a reference signal from the network control center to the user terminals to aid power and code time synchronization at the user terminals.

17. The method recited in claim 15 wherein the status messages are transmitted from the network control center to the user terminals by way of the communication system on the satellite.

18. The method recited in claim 15 wherein the status messages are broadcast from the network control center during user registration and authentication.

* * * * *